US006574795B1

(12) United States Patent
Carr (10) Patent No.: US 6,574,795 B1
(45) Date of Patent: Jun. 3, 2003

(54) RELIABLE COMMUNICATION OF DATA BY SUPPLEMENTING A UNIDIRECTIONAL COMMUNICATIONS PROTOCOL

(75) Inventor: Wayne J. Carr, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/370,526

(22) Filed: Aug. 6, 1999

Related U.S. Application Data

(63) Continuation of application No. 09/321,939, filed on May 28, 1999.

(51) Int. Cl.[7] .......................... H04N 7/20; H04N 7/173; H04L 1/18; H04L 1/14; H04L 12/28
(52) U.S. Cl. .......................... 725/71; 725/121; 725/122; 725/123; 714/16; 714/48; 714/748; 714/749; 714/750; 370/394; 370/486; 370/487; 370/395.65
(58) Field of Search ................................. 725/121–123, 725/90, 71; 709/321–324; 714/16, 48, 748–750; 370/395.65, 394, 486, 487

(56) References Cited

U.S. PATENT DOCUMENTS

| | | | | |
|---|---|---|---|---|
| 4,807,224 A | * | 2/1989 | Naron et al. ................ 370/94 |
| 5,036,518 A | * | 7/1991 | Tseung ........................ 371/32 |
| 5,550,847 A | * | 8/1996 | Zhu ............................ 371/32 |
| 5,594,490 A | * | 1/1997 | Dawson et al. ............. 348/6 |
| 5,768,533 A | * | 6/1998 | Ran ...................... 395/200.77 |
| 5,850,265 A | * | 12/1998 | Suh ........................... 348/553 |
| 5,900,905 A | * | 5/1999 | Shoff et al. ................. 348/12 |
| 5,918,002 A | * | 6/1999 | Klemets et al. ........ 395/182.16 |
| 6,061,820 A | * | 5/2000 | Nakakita et al. ........... 714/751 |
| 6,081,907 A | * | 6/2000 | Witty et al. ................. 714/6 |
| 6,124,854 A | * | 9/2000 | Sartain et al. .............. 345/327 |
| 6,240,555 B1 | * | 5/2001 | Shoff et al. ................. 725/110 |
| 6,256,785 B1 | * | 7/2001 | Klappert et al. ............ 725/136 |
| 6,298,482 B1 | * | 10/2001 | Seidman et al. ............ 725/101 |
| 6,317,791 B1 | * | 11/2001 | Cohn et al. ................. 709/227 |
| 6,327,045 B1 | * | 12/2001 | Teng et al. .................. 358/1.15 |
| 6,338,094 B1 | * | 1/2002 | Scott et al. ................. 709/245 |
| 6,345,375 B1 | * | 2/2002 | Kelkar et al. ............... 714/748 |
| 6,351,467 B1 | * | 2/2002 | Dillon ......................... 370/432 |
| 6,381,748 B1 | * | 4/2002 | Lin et al. .................... 725/109 |
| 6,453,438 B1 | * | 9/2002 | Miller et al. ................ 714/749 |
| 6,460,180 B1 | * | 10/2002 | Park et al. .................. 725/40 |
| 6,501,763 B1 | * | 12/2002 | Bhagavath et al. ......... 370/432 |

OTHER PUBLICATIONS

Advanced Television Enhancement Forum Specification (ATVEF), Draft Version 1.1r26, 1–32, printed from web site http://www.atvef.com/atvef_spec/TVE–public.htm (Feb. 2, 1999).

*Advanced Television Enhancement Forum Specification (ATVEF)*, Comment Draft Version 1.0r1, pp. 1–20, printed from web site http://www.atvef.com/atvef_spec/TVE–public.htm (Oct. 18, 1998).

(List continued on next page.)

*Primary Examiner*—Andrew Faile
*Assistant Examiner*—Son P. Huynh
(74) *Attorney, Agent, or Firm*—Trop, Pruner & Hu, P.C.

(57) ABSTRACT

An information delivery system includes receiving platforms to receive data communicated from a transmitting source according to a unidirectional transfer protocol over a link. At least some receiving platforms process the received data to determine if a portion of expected data is missing. If so, a receiving platform is able to generate and send a request for the missing data according to a supplemental protocol that is separate from the unidirectional transfer protocol. The transmitting source is able to receive the request for missing data and to retransmit the missing data. The data may include ancillary information (e.g., enhancement data) associated with audio/video content (e.g., television content). By adding the supplemental protocol to enable requests for missing data, a unidirectional transfer protocol that is not reliable is made reliable as a mechanism is provided to ensure receipt of the transmitted data.

33 Claims, 6 Drawing Sheets

OTHER PUBLICATIONS

Intel Corporation, *Internet Intercast™ Technology*, pp. 1–29, printed from web site http://developer.intel.com/drg/hybrid_author/cookbooks/intercast/01.htm#1, dated at least as early as Jun. 2, 1998.

Paragon Cable, *Cable Modem Faq*, pp. 1–7, printed from web site http://www.paragonpdx.com/cablemod.html, dated at least as early as Feb. 16, 1999.

Intel Corporation, *Digital Broadcast Technology, What is Intel Doing to Lead the Way to Digital?* pp. 1–3, printed from web site http://developer.intel.com/drg/dbt/what_int.htm, dated at least as early as Dec. 29, 1998.

Whatis.com, Inc., *DOCSIS (Data Over Cable Systems Interface Specification)*, p. 1, printed from web side http://whatis.com/docsis.htm, dated at least as early as Feb. 16, 1999.

Intel Corporation, *How Intel ®Intercast ®Technology Works*, pp. 1–2, printed from web site http://www.intercast.com/intercast/howitwks.htm, dated at least as early as Jul. 15, 1998.

*Multicast Transport Protocol*, Request for Comments 1301, pp. 1–35, printed from web site ftp://ftp.isi.edu/in–notes/rfc1301.txt (Feb. 1992).

StarBurst Software Press Release, *Starburst Omnicast Provides First Software–Based Content Distribution Solution for One–Way Satellite Networks*, pp. 1–3, printed from web site http://www.starburstcom.com/pr_fec.htm., dated at least as early as Apr. 15, 1999.

Starburst Software, *Starburst MFTP—An Efficient, Scalable Method for Distributing Information Using IP Multicast*, pp. 1–7, printed from web site http://www.starburstcom.com/white.htm., dated at least as early as Apr. 15, 1999.

AT & T News Release, *Starburst Offer Reliable, Satellite–Based Multicasting*, pp. 1–2, printed from web site http://www.att.com/press/0496/960402.bsb.html. (Apr. 2, 1996).

* cited by examiner

RELIABLE COMMUNICATION OF DATA BY SUPPLEMENTING A UNIDIRECTIONAL COMMUNICATIONS PROTOCOL

CROSS-REFERENCE TO RELATED APPLICATION

This application is a continuation of copending U.S. Ser. No. 09/321,939, filed May 28, 1999, entitled "COMMUNICATING ANCILLARY INFORMATION ASSOCIATED WITH A PLURALITY OF AUDIO/VIDEO PROGRAMS."

BACKGROUND

The invention relates to reliable communications of data by supplementing a unidirectional communications protocol.

With improvements in communications technology, it has become possible to transport data along with television content. Traditionally, such data included ancillary information such as program sub-titles, emergency messages, closed caption messages, and program guide information. However, more recently, other types of ancillary information that may be sent with television content include enhancement data such as web pages, multimedia information, or other digital data files.

Various standards exist that provide for transmission of ancillary information along with television content. One standard is the Advanced Television Enhancement Forum (ATVEF) Specification, Draft Version 1.1r26, dated Feb. 2, 1999. The ATVEF Specification is designed to provide for transmission of enhancement data along with television content in both analog and digital systems, such as cable systems, satellite systems, terrestrial systems, and so forth.

The ATVEF Specification utilizes a one-way transmission protocol, the Unidirectional Hypertext Transfer Protocol (UHTTP), as described in the ATVEF Specification, to deliver portions of television enhancement data. UHTTP defines a one-way multicast-based data transfer protocol. However, the one-way transfer of enhancement data as defined by UHTTP does not provide a mechanism to send messages back to a source to request resends. UHTTP does provide for the ability to fill in missing segments of enhancement data by sending data repeatedly. A device at the receiving end is able to fill in missing segments of data using the retransmitted files. However, if the total amount of enhancement data is large, the time needed to transfer an entire cycle of enhancement data may be large, perhaps as much as several hours, for example. Thus a receiver may have to wait a large amount of time before missing segments of data are retransmitted again. In a purely one way protocol there is no way to know how many times data must be sent to be sure of delivery.

UHTTP also provides a forward-error correction (FEC) scheme that enables recovery of some types of missing data. However, the amount of data that may be recovered using FEC may be limited.

A need thus exists for a more reliable method and system for communicating ancillary information built on top of a unidirectional communications protocol.

SUMMARY

In general, according to one embodiment, a system for receiving data over a link includes a receiver to receive data communicated according to a one-way communications protocol. A controller processes the received data to determine if a portion of expected data is missing. The controller is able to generate a request for the missing data.

Other features and embodiments will become apparent from the following description and from the claims.

DETAILED DESCRIPTION

In the following description, numerous details are set forth to provide an understanding of the present invention. However, it is to be understood by those skilled in the art that the present invention may be practiced without these details and that numerous variations or modifications from the described embodiments may be possible. For example, even though reference is made to the Advanced Television Enhancement Forum (ATVEF) Specification, Draft Version 1.1 r26, dated February 1999, it is contemplated that other versions and standards and techniques for transmission of ancillary data with television content (or other types of audio/video content) may be included in further embodiments. Further, the invention is not to be limited to the Unidirectional Hypertext Transfer Protocol (UHTTP), as described in the ATVEF Specification, as other one-way or unidirectional transport protocols for transferring ancillary information or other types of information may be used in further embodiments.

As used in this description, the term audio/video (A/V) content is intended to include any type of audio and/or video data that may be transmitted or distributed to one or more receiving sites for presentation to viewers. Although this description refers to A/V content that includes both audio and video components, it is contemplated that further embodiments may include transmitted content that includes audio but not video components and vice versa or no audio or video at all. The description relates to file transfer regardless of the medium on which it is transmitted or what else is transmitted with it. In addition, although reference is made to communicating enhancement data, it is contemplated that other types of information may be communicated in further embodiments.

Figure 1:
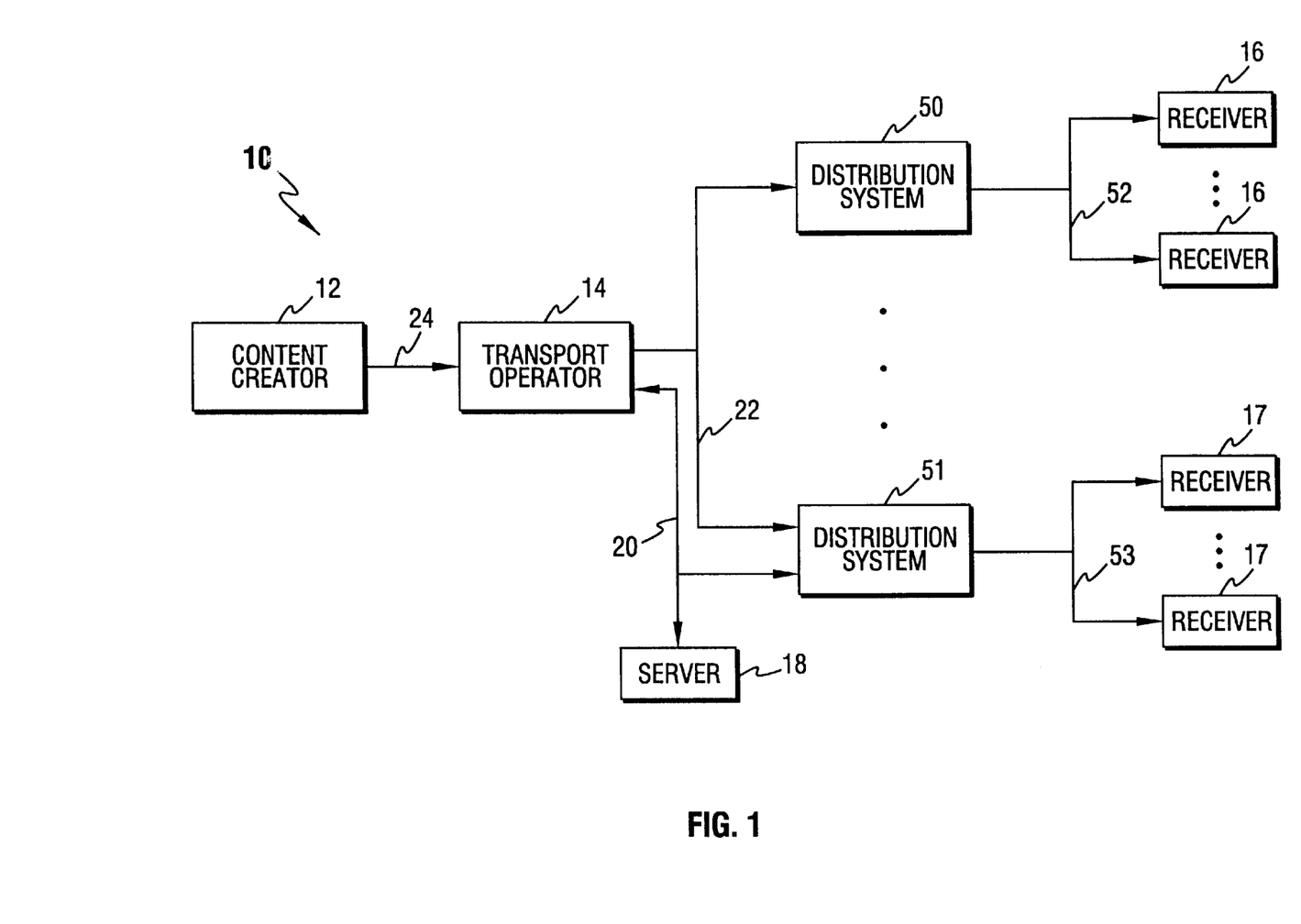
FIG. 1 illustrates an embodiment of an information delivery system.

Referring to FIG. 1, an information delivery system 10 according to one embodiment includes a content creator 12, a transport operator system 14, distribution systems 50 and 51, and a plurality of receivers 16 and 17. The receivers 16 and 17 may be located at various receiving sites, including homes, offices, entertainment facilities, or other locations. The receivers 16 or 17 may include televisions, set-top boxes, personal computers, and other types of systems that may be adapted to receive A/V content and associated enhancement data. Alternately, the data can include resources that are not associated with audio or video at all and that are transmitted over a data network like the Internet or other public network. The content creator 12 originates enhancement data and A/V content to be transmitted by the transport operator system 14. Alternatively, the content creator 12 may create the enhancement data with A/V content provided by another source to the transport operator system 14. Enhancement data may include graphics, presentation layout, synchronization information and other information. One standard for describing transmission of enhancement data with television content is the ATVEF Specification.

The transport operator system 14 provides an information delivery infrastructure that may include terrestrial, cable, satellite, networks like the Internet or other types of transmission facilities. The A/V content and/or data may be transmitted in digital format over a transport medium 22, which may be a terrestrial, cable, satellite, or other types of links, to the distribution systems 50 and 51. In turn, each distribution system 50 or 51 transmits enhanced A/V content (including enhancement data and A/V content) to respective receivers 16 or 17 over transport medium 52 or 53.

In one arrangement, the enhancement data may be sent as part of the vertical blanking interval (VBI) of an analog transport medium 52, 53 between respective distribution system 50, 51 and receivers 16, 17. Transport media 52 and 53 may be according to the National Television System Committee (NTSC) Standard of the Electronics Industries Association, a description of which may be found in Keith Jack, "Video Demystified: A Handbook for the Digital Engineer," HighText Publications (2d Edition, 1996). Other types of transport media (whether analog or digital) may also be provided to communicate A/V content along with enhancement data to the receivers 16, 17. For example, the transport media 52, 53 may include cable, a satellite link, or other types of links.

Enhancement data according to the ATVEF Specification may include one or more enhancements, with each enhancement including three components: ATVEF announcements, resources, and triggers. An announcement indicates that enhancement data is being transmitted, resources include files that contain the contents of the enhancement to be presented, and a trigger synchronizes the enhancement data with the transmission of the A/V content. Announcements that are repeatedly sent may describe the locations of both a resource data stream and a trigger stream. For each A/V channel (e.g., TV channel), one or more enhancements may be offered as choices presented to the user, who can select which of the enhancements, if any, to view.

The resource data and A/V content may be transmitted by the transport operator system 14 in a digital format (e.g., MPEG-2 format or other format) to the distribution systems 50 and 51 over the transport medium 22. MPEG stands for Moving Picture Experts Group, and the MPEG-2 standard is described in ISO/IEC 13818-1 (MPEG-2 Systems), ISO/IEC 13818-2 (MPEG-2 Video) and ISO/IEC 13818-3 (MPEG-2 Audio), dated in 1994 and provided by the International Organization for Standardization (ISO) and the International Electrotechnical Commission (IEC). The MPEG-2 standard provides a generic coding technique for moving pictures and associated sound of various applications, including digital storage media, television transmission, and data communications. Other formats may also be specified for transferring the resource data and A/V content in further embodiments.

The enhancement data (including announcements, resource files, and trigger files) may be transmitted over the transport medium 22 to the distribution systems 50, 51 using Internet Protocol (IP) multicast, such as the Multi cast Transport Protocol described in Request for Comment (RFC) 1301, dated February 1992. Requests for Comments (RFCs) may be found at the web site {http://www.ietf.org/rfc.html}. Further, resource files are sent using a one-way transfer protocol (e.g., UHTTP, which is a one-way IP multicast-based transfer protocol). Although UHTTP provides a robust delivery mechanism by providing a forward error correction mechanism as well as a carousel mechanism (in which sets of entire resource files are repeatedly sent), truly reliable delivery of data is not provided. UHTTP is robust in that the forward error correction and carousel mechanisms increase the likelihood that all resource data have been received, but the lack of feedback from the receiving platform to the transmitting source prevents reliable delivery.

To provide for reliable communication of the resource data using UHTTP, a reliable delivery mechanism according to an embodiment is provided to supplement UHTTP. The reliable delivery mechanism defines a supplemental protocol that is separate from the one-way or unidirectional transfer protocol. This delivery mechanism enables any one of the distribution systems 50 and 51 (and other systems if they exist) to issue requests for missing portions of the resource files. Alternately, one or more of the receivers 16, 17 may make the retransmission requests. Since transmission errors in TV often affect large numbers of users, one possibility is to have some special receivers acting on behalf of other receivers in the same area. In further embodiments, the reliable delivery mechanism can be employed to supplement other one-way or unidirectional data transfer protocols. Requests may be sent over a secondary link 20 or some other back link between the transport operator system 14 and the distribution systems 50 and 51. Although, illustrated as two separate links, the links 20 and 22 do not have to be separate but may actually be implemented with a single communications channel that allows requests to be sent back from the distribution systems 50 and 51 to transport operator system 14. An example link 20 includes a Very Small Terminal Aperture (VSAT) link or other type of data link (e.g., the Internet). Both wired and wireless links are contemplated.

Figure 2:
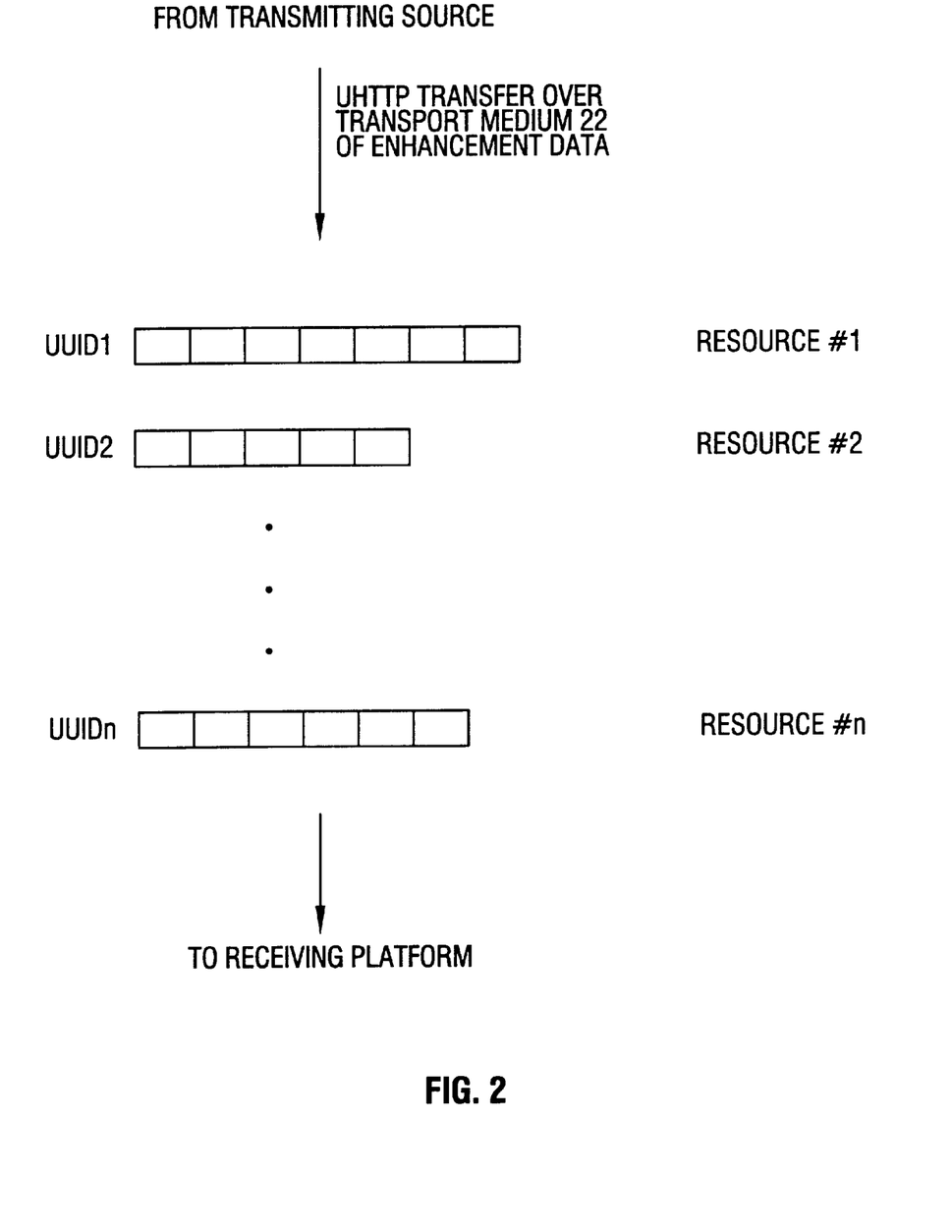
FIG. 2 illustrates transmission of enhancement resource data in the information delivery system of FIG. 1.

Referring to FIG. 2, a transfer of enhancement resource data according to UHTTP over the transport medium 22 is illustrated. Each A/V channel (such as a TV channel) may be associated with one or more enhancements including corresponding resource files, illustrated as resource #1, resource #2, and resource #n. Each resource may be associated with a plurality of segments, which may be packets or datagrams encapsulated according to the User Datagram Protocol (UDP). A description of UDP may be found in Request for Comment (RFC) 768, entitled "User Datagram Protocol," dated August 1980. Each packet includes a header that contains an identifier (such as a universally unique identifier or UUID) to identify the enhancement that the packet is associated with. Each packet may further include header information to enable a receiving platform to place the packet data following the header in the appropriate location within a stream of received data and to indicate how long to continue listening for additional data. Such header information may include ResourceSize (to indicate the size of the resource data) and StartByte (which is an offset into the resource stream where the packet's payload starts). Based on the StartByte and ResourceSize values, a receiving platform is able to place a packet in proper order even if packets are received out of order. In addition, missing packets may be identified by the receiving platform based on such fields.

Based on received resource data segments (which in the illustrated example embodiment includes resource file packets), and their associated header information, a receiving platform, such as the distribution system 50 or 51, is able to determine if any segments (e.g., resource file packets) are missing. If so, using the reliable delivery mechanism according to an embodiment, the receiving platform can issue requests over the secondary link 20 back to the transport operator system 14 (the transmitting source) to request resends of the missing segments. Such requests include messages which may be interpreted by the transport operator system 14 as a request to retransmit one or more segments. Since the one-way protocol for resource transfer allows repeated resends of data segments, an out-of-band request for resending segments can be satisfied by sending the requested segments in the original one-way resource transmission. Another feature of the one-way transfer protocol is that it allows data segments (e.g., packets) to arrive out of order. The data segments are placed in the proper order by each receiver. Receivers that are not designed to use the reliability extension still benefit if they also missed receiving the same segments. The one way resource transmission protocol does not need to be changed. Reliability is built on top of it using the original capabilities of allowing multiple out-of-order receipt of the same segments. In one example embodiment, the resend request messages may be a variation of the GET or POST message according to the Hypertext Transfer Protocol (HTTP), as described in RFC 2068, entitled "Hypertext Transfer Protocol—HTTP/1.1," dated January 1997. The GET method according to HTTP retrieves information that is identified by a request-URI (uniform resource identifier), which can specify byte ranges to fetch. A URI is a string that identifies a resource by name, location, or other characteristic. In response to the request, the transport operator system 14 (or some other transmitting source) can resend missing segments of resource data over the link 22 (such as by sending the packets over a satellite or television link using IP multicast). In one embodiment, a request for resend of one or more packets of data may effectively be a negative acknowledge (NACK) to report missing data.

Alternatively, the receiving platform (e.g., distribution system 50 or 51) may fetch missing data from a source different than the transmitting source (e.g., the transport operator system 14). An alternative source of the resource data may be a server 18 that is connected to the secondary link 20. The server 18 may contain a web site on which resource data may be accessible. The server 18 may respond to a request for missing data by returning resource data segments using either an HTTP transfer or an IP multicast over the secondary link 20. In this case the missing data is not sent in the original one way delivery stream.

Thus, in one embodiment, resource data segments (e.g., resource file packets) are transmitted according to a one-way or unidirectional IP multicast protocol, such as UHTTP. A characteristic of the one-way transfer protocol is that while it can repeat transmission of certain pieces of data, the protocol does not "guarantee" receipt of the data to provide for reliable communication. As used here, reference to the guarantee of receipt of data indicates the ability of a receiving platform to request missing segments of data and a source being able to respond to the requests sending or resending the missing data segments. Reliable communication of data refers to communication in which a receiving platform can detect and request missing data segments and a source being able to send or resend the missing data segments. Thus, the terms "guarantee" and "reliable" do not necessarily connote absolute guarantee or absolutely reliable, particularly in the presence of failure or misoperation of one or more components (software or hardware) in a system. However, if the system is still connected and operational, missing data can be requested and delivered.

Because a one-way or unidirectional transfer protocol does not provide for reliable data transfer, a reliable delivery mechanism is added on, or supplements, the unidirectional transfer protocol to enable reliable communication of resource data. According to the delivery mechanism of an embodiment, a receiving platform that detects missing segments is capable of issuing a request over a back link, such as by using an HTTP request, for the missing segments. A characteristic of the HTTP request is that it is a request/response message, in which a client (e.g., the receiving platform) sends a request to a server (e.g., the transmitting source or other server). The server responds with predefined categories of information.

The request for missing resource data segments may include a uniform resource locator (URL) and unique identifiers UUIDs identifying one or more enhancements that may be included in the request for missing data. In addition, a range of addresses indicating the missing data segments may also be included in the request message. The range of addresses of the missing segments may be based on the segments that have been received, from which the receiving platform can derive which segments are missing. An example GET request may be as follows:

GET http://www.company.com/UUID/AddressRanges

Based on the URL, UUIDs, and addresses of missing data segments provided in the request message, the transport operator system 14 or server 18 can identify the location(s) of the missing packets. The missing data segments are fetched from storage devices in the transport operator system 14, one or more servers 18, or other storage locations.

In accordance with some embodiments, a supplementary reliable delivery mechanism is thus provided to allow receiving platforms such as distribution systems 50, 51 to retrieve missing resource data segments transmitted using a multicast-based unidirectional transfer protocol (e.g., UHTTP or other type of one-way data transfer protocol). Any missing segments may be requested and received by the distribution systems 50, 51 before enhancement data and A/V content are transmitted by the distribution systems 50, 51 to respective receivers 16, 17. In other arrangements, instead of using distribution systems 50, 51 to perform the task of requesting missing data segments, monitor centers may be used to perform such tasks. The monitor centers may listen in on the transmission of A/V content and enhancement data to receivers 16, 17 from respective distribution systems 50, 51 (or, alternatively, directly from the transport operator system 14). If the monitor centers determine that certain data segments are missing, the monitor centers may issue requests back to the transport operator system 14 to resend the missing data segments in the original resource transmission.

Figure 3:
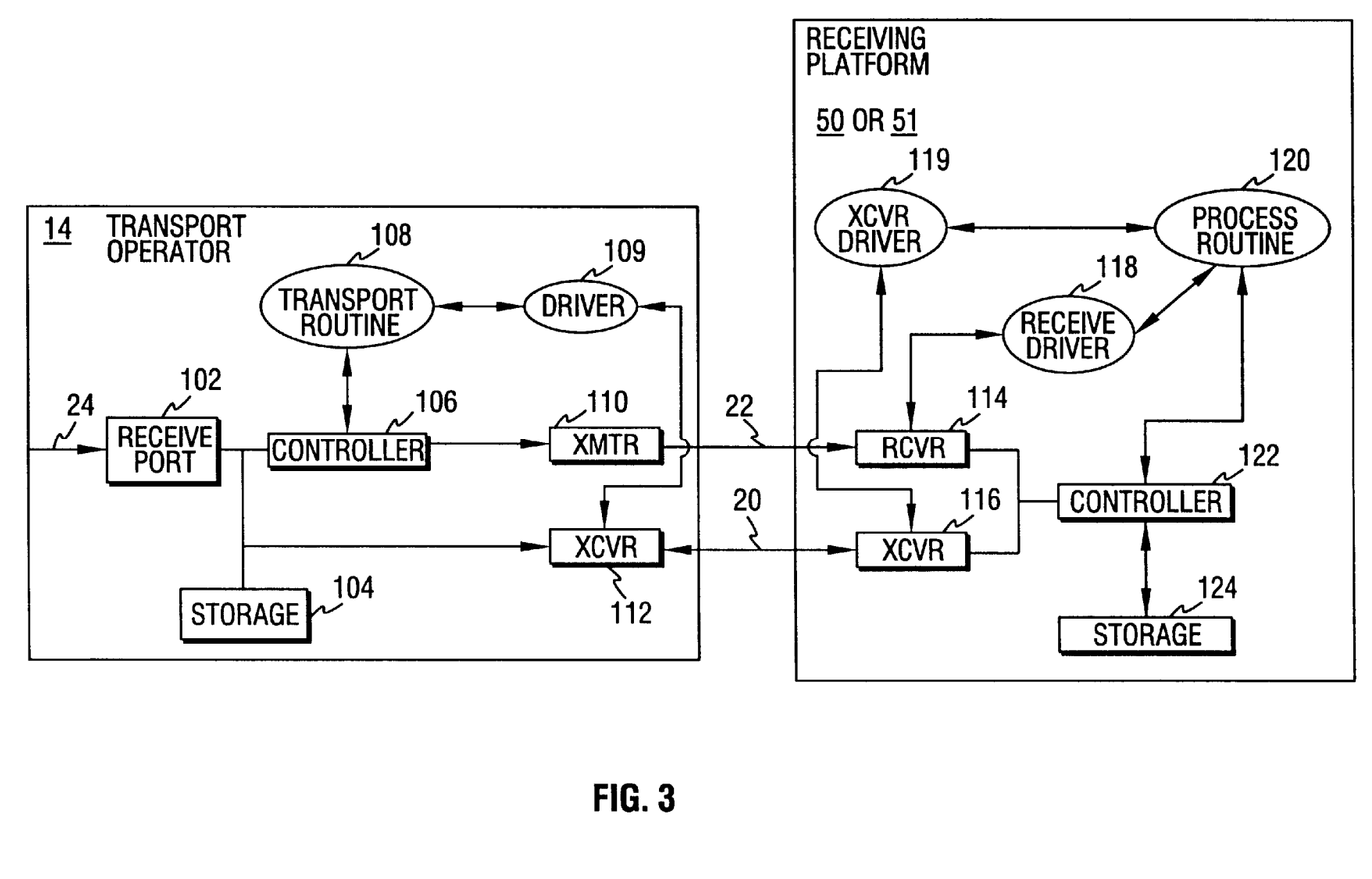
FIG. 3 is a block diagram of a transmitting source and a receiving platform in accordance with one embodiment in the information delivery system of FIG. 1.

Referring to FIG. 3, components in the transport operator system 14 and a receiving platform (e.g., the distribution system 50 or 51) are illustrated. The transport operator system 14 may include a receiving port 102 to receive enhancement, data (including resource data) from the content creator 12 over a link 24. The received data may be provided to a controller 106 in the transport operator system 14. A/V content may be received with the enhancement data through the port 102 or through a separate A/V receive port (not shown). The controller 106 may be run under control of a software routine 108 (referred to as a transport routine). The transport routine 108 may initially be stored in a storage medium 104 and loaded by the controller 106 for execution.

Instructions and data of the transport routine 108 may also be stored in the storage medium 104.

Resource data and A/V content may be transmitted in digital format by a transmitter 110 over the transport medium 22. The transport operator system 14 may also include a transceiver 112 adapted to communicate over the secondary link 20. The transceiver 112, may be adapted to receive requests from one or more receiving platforms for missing resource data segments, which are forwarded by the transceiver device driver 109 to the transport routine 108 for processing. The transceiver 112 may be a telephone modem, a cable modem, or any other type of analog or digital transceiver adapted to communicate over the secondary link 20. If the transport medium 22 and secondary link are physically a single link, a single transceiver may be included in the transport operator system 14. In such other embodiments and applications, the data transmitted and received can include data other than ancillary information associated with A/V content.

In the receiving platform (e.g. distribution system 50 or 51, a monitor center, or other receiving system or device), a receiver circuit 114 is adapted to receive data, including resource data and A/V content, over the transport medium 22, and the transceiver 116 is adapted to communicate over the secondary link 20. Data received by the receiver circuit 114 are forwarded to a receive device driver 118, which sends it to an resource process routine 120 for processing according to an embodiment. Further, communication between the resource process routine 120 and the transceiver 116 may occur through a transceiver device driver 119. The device drivers 118 and 119 and resource process routine 120 may be executable on a controller 122. Software routines (including the device drivers 118 and 119 and resource process routine 120) in the receiving platform may be initially stored in one or more storage media 124 and loaded by the controller 122 for execution. The resource process routine 120 is capable of detecting if any resource data segments transmitted by the transport operator system 14 are missing, and if so, issuing a request through the transceiver 116 over the secondary link 20 for the missing data segments.

Figure 4:
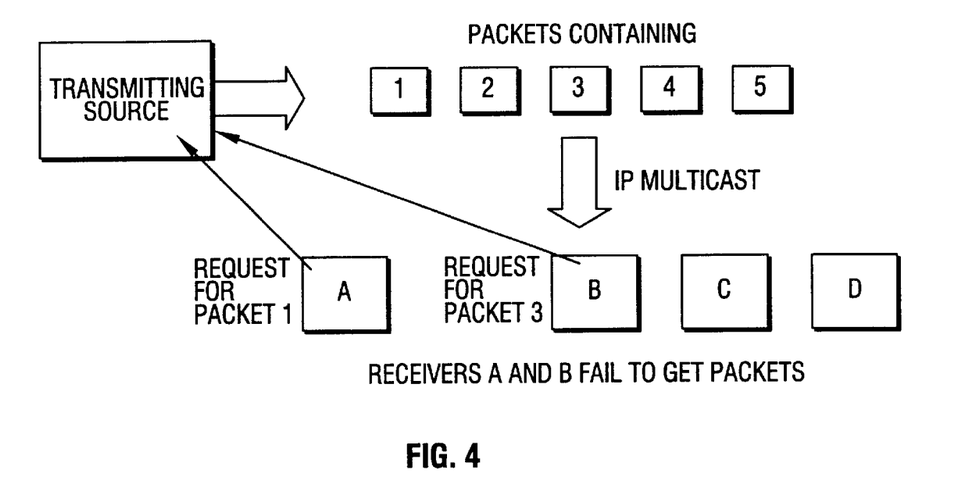
FIGS. 4 and 5 illustrate communication of data from a transmitting source to receiving platforms in accordance with one embodiment of the invention.
Figure 5:
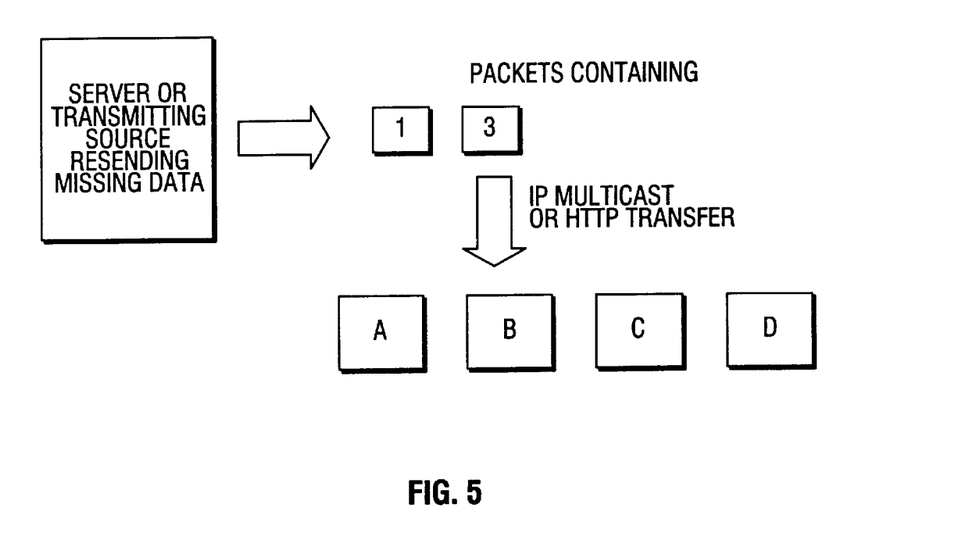

Referring to FIGS. 4 and 5, a process of communicating resource data segments between a transmitting source (such as the transport operator system 14) and receiving platforms A, B, C, and D (which may include the distribution systems 50 and 51) is illustrated. The transmitting source may transmit a sequence of resource file packets, illustrated as packets 1–5 in FIG. 4, over the transport medium 22. Although not shown, announcements and triggers may also be transmitted along with the resource file packets. Announcements are used by the receiving platform to detect the presence of enhancement data.

The resource file packets may be sent to a plurality of receiving platforms A–D using HTTP or some other one-way transfer protocol. One or more of the receiving platforms may have failed to receive one or more of the transmitted resource file packets. In the illustrated example, receiving platform A may have failed to receive packet 1, and receiving platform B may have failed to receive packet 3. Thus, receiving platform A may send a request for packet I back to the transport operator system 14 (or another source such as the server 18) over the link 20. Similarly, the receiving platform B may send a request for missing packet 3 over the link 20. In response to the requests, the transport operator system 14 (or the server 18) may resend packets 1 and 3 (over either link 20 or 22) using IP multicast in the original one-way resource set transfer or an HTTP transfer to the receiving platforms, illustrated as platforms A–D, in FIG. 5. The process may be reiterated until no receiving platforms report missing data.

Advantages offered by some embodiments of the invention may include one or more of the following. Improved reliability of communicating data transmitted according to a unidirectional multicast transfer protocol such as UHTTP may be achieved. Such reliability may be provided without having to retransmit entire packages of data, which may be quite large and thus time consuming. Some embodiments may be useful for situations like satellite broadcasts of files to centralized operation centers with satellite back channels for limited return data. Another use may be satellite or television delivery of relatively important files to users in locations with telephone back channels that may be relatively expensive to use. Thus, usage and bandwidth requirements on relatively expensive back connections may be reduced while using broadcast or multicast for efficient delivery of information.

Figure 6:
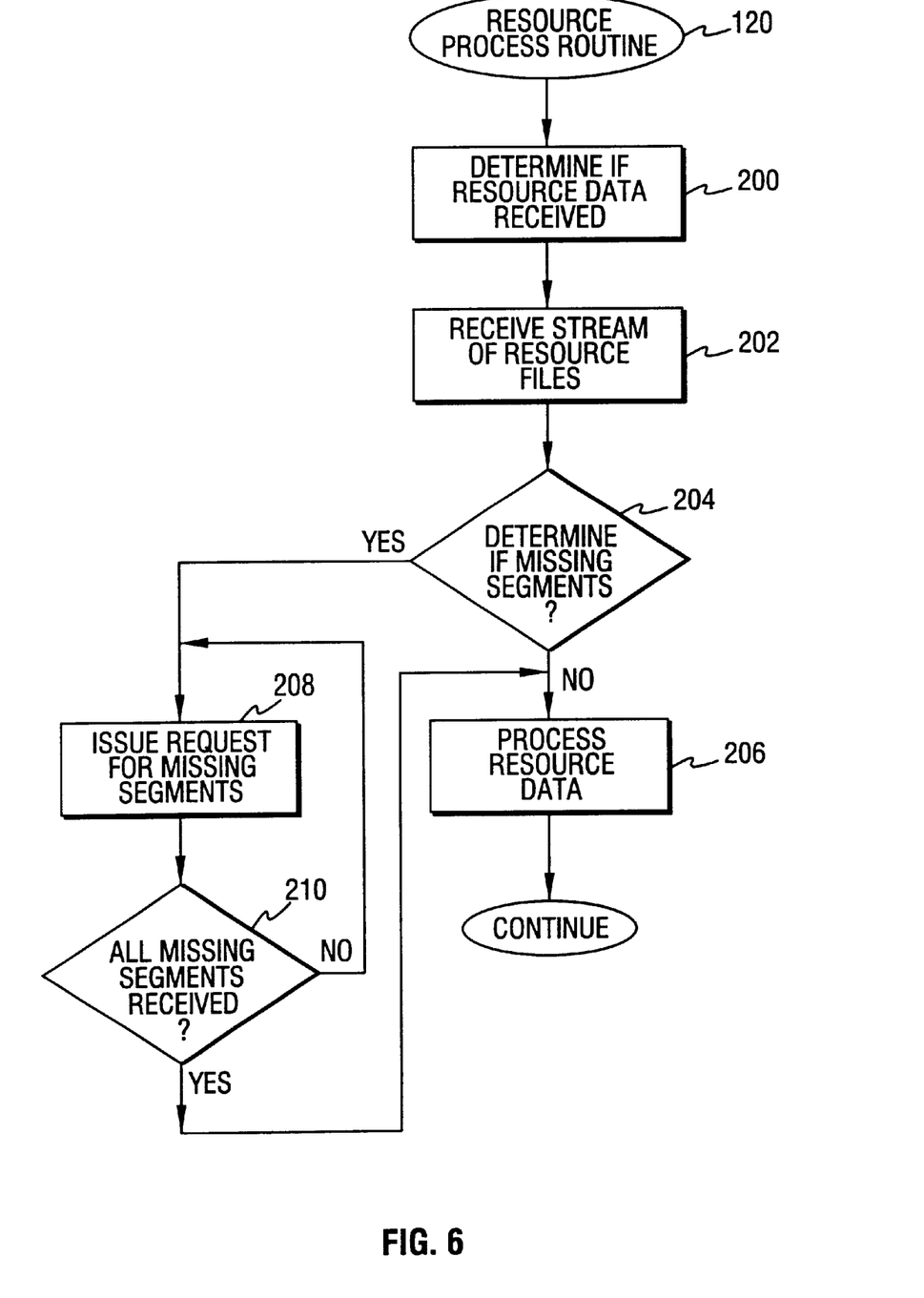
FIG. 6 is a flow diagram of a resource process routine according to an embodiment in the receiving platform of FIG. 3.

Referring to FIG. 6, a flow of the process performed by the resource process routine 120 is illustrated. First, the resource process routine determines (at 200) if it has received resource data. This may be performed, by looking for one or more announcements indicating the existence of enhancements including the resources. Based on information in the announcements, locations of resource files making up the content of the enhancements may be identified. The resource process routine 120 then receives a stream of resource files (at 202). From information located in the headers of the packets making up the enhancement resource files, the resource process routine 120 is able to determine (at 204) if segments of the resource data (in this example packets) are missing. If not, normal processing is performed on the resource data (at 206). If missing segments exist, then the resource process routine forms requests (at 208) for the missing segments. As noted above, such requests may be in the form of an HTTP GET message transmitted by the transceiver 116 over the secondary link 20 to the transport operator system 14 and/or server 18. Each request may include a URL, a UUID identifying a resource in which missing segments have occurred, and address ranges to indicate addresses of the missing segments. Even when requested with HTTP, the data need not be returned on that one-to-one TCP connection. Requests can be satisfied by adding to the original resource set transmission. Often resources are sent one after the other in a carousel. All that needs to be done is to add the repeated segments anywhere in that transmission. After the requests have been transmitted, the resource process routine 120 determines (at 210) if all of the missing segments have been received. If not, the remaining missing segments may be requested again (at 208). Otherwise, if all missing segments have been received, the resource process routine 120 proceeds to normally process the resource data (at 206).

Figure 7:
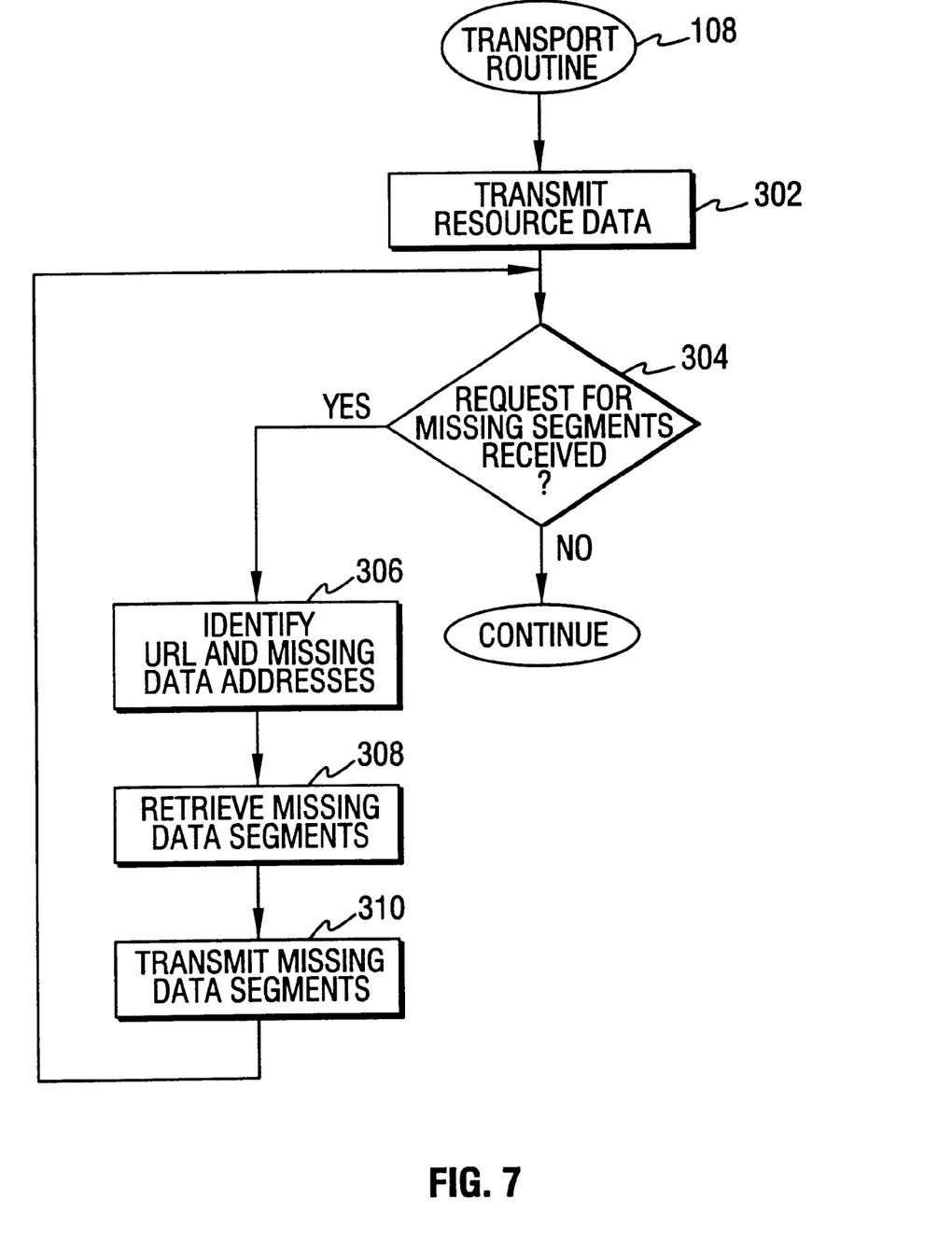
FIG. 7 is a flow diagram of a transport routine according to an embodiment in the transmitting source of FIG. 3.

Referring to FIG. 7, the flow of the transport routine 108 in accordance to an embodiment is illustrated. The transport routine 108 transmits resource data (at 302) over the transport medium 22 as conventionally done, which may be by IP multicast, for example. Next, the transport routine 108 determines (at 304) if requests for missing resource segments have been received. If not, the transport routine 108 proceeds to other tasks. If requests for missing segments have been received, then the transport routine 108 uses information in the requests to locate and retrieve (at 308) the missing data segments from one or more storage devices, which may be the storage device 124 (FIG. 3) or some other suitable storage device, such as one coupled over a network (e.g., local area network, wide area network; the Internet, and so forth). After the missing data segments have been retrieved, they may be transmitted (at 310) back to the receiving platform either on the transport medium 22 or the secondary link 20, using either IP multicast or an HTTP transfer.

Instead of the transport operator system 14 responding to requests for missing data segments, one or more servers 18 may perform such tasks, which may be similar to the tasks performed at 304–310.

Various software routines, modules, or layers, such as those discussed above, may be stored or otherwise tangibly embodied in one or more machine-readable storage media in devices in the information delivery system. Storage media suitable for tangibly embodying software instructions may include different forms of memory including semiconductor memory devices such as dynamic or static random access memories, erasable and programmable read-only memories (EPROMs), electrically erasable and programmable read-only memories (EEPROMs) and flash memories; magnetic disks such as fixed, floppy and removable disks; other magnetic media including tape; and optical media such as (compact disc) CD or (digital video disc) DVD disks. The instructions stored in the one or more storage media when executed cause devices in the information delivery system to perform programmed acts.

The software can be loaded into devices in the information delivery system in one of many different ways. For example, instructions or other code segments stored on one or more storage media or transported through a network interface card, modem, or other interface mechanism may be loaded into devices in the system and executed to perform programmed acts. In the loading or transport process, data signals that are embodied as carrier waves (transmitted over telephones, network lines, wireless links, cables and the like) may communicate the instructions or code segments to devices in the information delivery system.

Some of the examples described here use delivery of enhancements related to audio/video content as examples. The invention is not limited to the delivery associated with audio/video content. UHTTP from ATVEF, for example, is also useful for file delivery of other types of data on the Internet or other public network. The technique and system described here to supplement UHTTP, which is an unreliable protocol, can be employed in the context of delivering other data (besides A/V data) to make delivery reliable although the main data delivery mechanism employs an unreliable file transfer protocol. Thus, as used here, the term "resource data" when delivered by a file transfer protocol such as UHTTP or some other unidirectional or one-way transfer protocol may refer to any type of data.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of reliably communicating resource data, comprising:
   receiving resource data segments transmitted by a source according to a unidirectional multicast resource transfer protocol that permits delivery of data segments repeatedly and out of order;
   receiving an announcement indicative of a location of the resource data segments;
   in response to the announcement, identifying the location of the resource data segments;
   determining if one or more segments of the resource data are missing; and
   utilizing a secondary delivery mechanism defined outside the unidirectional multicast transfer protocol to request retransmission of the missing resource data segments, wherein receiving the resource data segments includes receiving ancillary data associated with an audio/video broadcast.

2. The method of claim 1, wherein the receiving is performed by receivers, and wherein the determining is performed by at least one of the receivers.

3. The method of claim 1, further comprising communicating the resource data segments to a plurality of receivers, wherein the determining is performed by one or more modules that are separate from the receivers.

4. The method of claim 1, wherein the requesting is performed over a back link coupled between a receiving platform and the source.

5. The method of claim 1, wherein the requesting includes sending a request containing one or more identifiers associated with the missing resource data segments.

6. The method of claim 1, wherein the requesting includes sending a request containing one or more data ranges corresponding to the missing resource data segments.

7. The method of claim 1, wherein the requesting includes sending a request according to a Hypertext Transfer Protocol.

8. The method of claim 7, wherein the requesting includes sending a GET or POST request according to the Hypertext Transfer Protocol.

9. The method of claim 7, wherein the receiving includes receiving the resource data segments transmitted according to a Unidirectional Hypertext Transfer Protocol.

10. The method of claim 1, wherein the requesting includes requesting retransmission of the missing segments from the source.

11. The method of claim 1, wherein the requesting includes requesting retransmission of the missing segments from a server other than the source.

12. A system comprising:
   a receiver to receive data communicated according to a one-way communications protocol that does not provide for reliable delivery of the data but where the protocol permits delivery of data segments repeatedly and out of order, and the receiver to receive an announcement indicative of a location of the data; and
   a controller to use the announcement to identify a location of the data and determine if a portion of the data is missing and to generate a request to retransmit missing data according to a supplemental protocol defined separately from the one-way communications protocol so that reliable delivery of the data is available.

13. The system of claim 12, wherein the data includes enhancement data associated with an audio/video broadcast.

14. A method of reliable communications, comprising:
   transmitting segments of information according to a one-way transfer protocol for receipt by one or more receiving platforms where the protocol permits delivery of data segments repeatedly and out of order;
   transmitting an announcement indicative of a location of the segments of information;
   receiving one or more requests according to a supplemental protocol separate from the one-way transfer protocol from one or more receiving platforms for missing information segments; and
   retransmitting the missing information segments in response to the one or more requests.

15. A method of reliable communications, comprising:

transmitting segments of information according to a one-way transfer protocol for receipt by one or more receiving platforms where the protocol permits delivery of data segments repeatedly and out of order;

transmitting an announcement indicating a location of the segments of information;

receiving one or more requests according to a supplemental protocol separate from the one-way transfer protocol from one or more receiving platforms for missing information segments; and retransmitting the missing information segments in response to the one or more requests, wherein the information segments are transmitted as ancillary data associated with an audio/video broadcast.

16. The method of claim 15, wherein the requests are received from a back link coupled to the one or more receiving platforms.

17. The method of claim 15, wherein the retransmitting includes retransmitting the missing information segments over a transport medium used to transmit the ancillary information segments.

18. The method of claim 15, wherein the retransmitting includes retransmitting the missing information segments according to an Internet Protocol multicast technique.

19. The method of claim 15, wherein the retransmitting includes retransmitting the missing information segments according to a Hypertext Transfer Protocol.

20. The method of claim 15, wherein the information segments are transmitted as ancillary data associated with a television broadcast.

21. A system for receiving data over a link, comprising:

a receiver to receive data communicated according to a one-way communications protocol where the protocol permits delivery of data segments repeatedly and out of order, the receiver to receive an announcement indicative of a location of the data; and a controller to process the announcement and the received data to determine if a portion of expected data is missing, the controller generating a request for the missing data, the request being defined according to a supplemental protocol separate from the one-way communications protocol, wherein the data includes enhancement resource data associated with audio/video content.

22. The system of claim 21, further comprising a circuit to send the request for missing data over a secondary link according to the supplemental protocol.

23. The system of claim 21, wherein the supplemental protocol includes a Hypertext Transfer Protocol.

24. The system of claim 21, wherein the one-way communications protocol includes a Unidirectional Hypertext Transfer Protocol.

25. The system of claim 21, wherein the enhancement resource data is according to an Advanced Television Enhancement Forum Specification.

26. A system for transmitting data over a transport medium, comprising:

a transmitter to transmit data over the transport medium according to a unidirectional transfer protocol where the protocol permits delivery of data segments repeatedly and out of order, the transmitter to transmit an announcement indicating a location of the data over the transport medium;

a receiver to receive one or more requests for missing data, the one or more requests being defined outside the unidirectional transfer protocol; and a controller to process the one or more requests and to identify the missing data requested for retransmission by the transmitter, wherein the data includes ancillary information associated with audio/video content.

27. The system of claim 26, wherein the transmitter retransmits the missing data over the transport medium.

28. The system of claim 26, further comprising a second transmitter to transmit the missing data over a secondary communications link.

29. The system of claim 28, wherein the second transmitter transmits the missing data according to a Hypertext Transfer Protocol.

30. The system of claim 29, wherein the second transmitter and the receiver form a transceiver.

31. The system of claim 26, wherein the transmitter sends the missing data by Internet Protocol multicast.

32. An article including one or more machine-readable storage media containing instructions for communicating data, the instructions when executed causing a system to:

receive data over a transport medium sent according to a unidirectional transfer protocol where the protocol permits delivery of data segments repeatedly and out of order;

receive an announcement over the transport medium indicative of a location of the data;

determine if a portion of the data is missing; and generate a request defined according to a supplemental protocol separate from the unidirectional transfer protocol for retransmission of the missing data portion.

33. The article of claim 32, wherein receiving the data comprises receiving enhancement data associated with an audio/video broadcast.

* * * * *